Sept. 4, 1951

E. E. CRUMP

TUNING CONTROL FOR THERMALLY TUNED DEVICES OR OSCILLATORS

Filed Jan. 11, 1949

2,566,825

INVENTOR
E. E. CRUMP
BY H. A. Burgess
ATTORNEY

Patented Sept. 4, 1951 2,566,825

UNITED STATES PATENT OFFICE 2,566,825

TUNING CONTROL FOR THERMALLY TUNED DEVICES OR OSCILLATORS

Elmo E. Crump, West Caldwell, N. J., assignor to Bell Telephone Laboratories, Incorporated, New York, N. Y., a corporation of New York Application January 11, 1949, Serial No. 70,223

9 Claims. (Cl. 250—36)

This invention relates to electrical control circuits, and more particularly to electric circuits for controlling devices characterized by an undesirable delay in the response of the controlled means to an operation of the controlling means. One use of the invention is in electrically regulated thermal control devices and particularly those employed in space discharge devices.

It is an object of this invention to decrease the response time in an electrically controlled device characterized by an inherent time delay in the response of the controlled means to an operation of the controlling means.

It is a further object of this invention to decrease the time lag in a thermal control device.

It is also an object to decrease the tuning time lag in a thermally tuned space discharge device.

It is well known that the natural frequency of a resonant cavity may be varied by altering the physical dimensions of the cavity. Therefore, in many of the various devices known in the art embodying cavity resonators, tuning has been effected by a distortion or dimensional change of the cavity resonator.

The present invention in the illustrative embodiment to be disclosed, is concerned particularly with those devices wherein said distortion or dimensional change is accomplished by thermal control means. The invention is equally applicable to thermal tuners in which the heat, upon which the distortion or dimensional change is predicated, is generated by a current flowing through the distortion member, to tuners in which the heat is generated by electron bombardment of the distortion member or operating means therefor, or to any tuners well known in the art wherein the resultant variation is dependent upon thermal action.

The invention, while applicable generally to electrical tuning, is especially adapted to the tuning of cavity resonators where positional control of the significant tuning element is of relatively great importance. Its application is not limited to the cavity resonators of reflex oscillators although perhaps having its best exemplification therein. Therefore, for the purpose of illustration, the invention will be described in detail as relating to a thermally tuned reflex oscillator, more particularly to one such as is disclosed in W. G. Shepherd Patent 2,513,371 dated July 4, 1950.

Therein is disclosed a reflex oscillator comprising a thermal control device to control the frequency of oscillation by the spacing of the cavity grids. The spacing of the cavity grids is made a function of the current flowing in the triode section of the oscillator or the power dissipated in the thermally flexible means which are mechanically coupled to one of the cavity grids. The grid voltage of this triode section is therefore made the variable upon which the resonant frequency of the oscillator is dependent.

Since the flexing of these means is a thermal process, there is a finite and generally intolerable time lag between the adjustment of the triode grid voltage to a new value and the final adjustment of the oscillator frequency to its corresponding new value. The present invention greatly reduces this time lag by automatically applying a predetermined overshoot to the grid voltage as it is varied to a new value so that thermal equilibrium corresponding to the new voltage is much more quickly attained.

Other objects, features and aspects of the invention will be better understood from the following detailed description taken in accordance with the accompanying drawings of which:

Figure 1A:
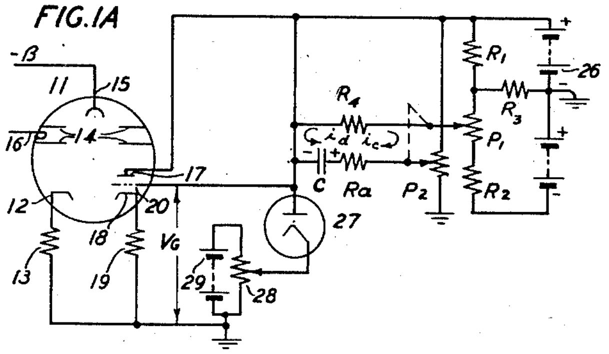
Fig. 1A is a schematic diagram of a circuit embodying principles of the invention.
Figure 1B:
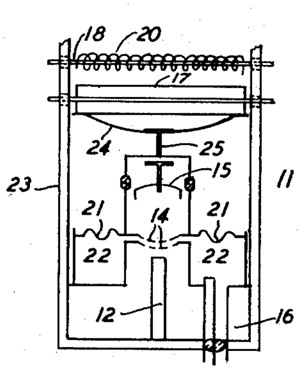
Fig. 1B is a simplified portrayal, in diagram only, of a type of thermal control means to which the invention as illustrated in Fig. 1A is applied.

With reference now to Figs. 1A and 1B, a reflex oscillator 11 with cathode 12, cathode resistor 13, cavity grids 14, repeller 15 and coaxial output coupler 16 has the relative spacing of its grids 14 under the control of a triode section comprising a plate 17, cathode 18, cathode resistor 19 and a control grid 20, all as disclosed in the aforementioned Shepherd application. And, as previously described, the positioning of the grids 14 is by a thermal process which is a function of the grid-cathode voltage of the triode section.

The thermal control means whereby the positioning of the grids 14 may be controlled will be briefly explained with particular reference to Fig. 1B. The element by which the relative spacing of the grids 14 is controlled is the elastic diaphragm 21. By a movement of this diaphragm normal to its plane, the position of the upper grid relative to the lower grid is varied, the position of the lower grid being held fixed by the lower walls of the resonant cavities 22 and the housing 23, with a consequent variation in the tuning of the resonator. The plate 17 of the triode section comprises a thermally expansible electron bombarded element cooperating with a source of electrons 18 and the control grid 20. The heat induced in the plate 17 by the bombardment of electrons from the cathode 18 changes its length and this results in a longitudinal movement of the ends of the element 17, it being restrained from transverse motion by the housing 23. This thermally induced movement is transmitted to the diaphragm 21 through a tuner bow 24 rigidly attached to the ends of the plate 17, and a mechanical coupling comprising the yoke 25 rigidly coupled to the bow 24 and the diaphragm 21. The thermal control assembly has been described herein in a greatly simplified form and is described in greater detail in the aforementioned Shepherd application.

Figure 2:
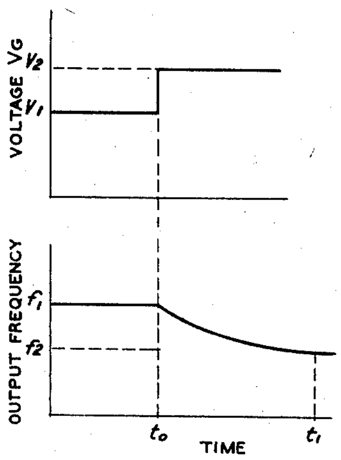
Fig. 2 shows graphs illustrative of prior art practice.

Referring again to Fig. 1A, the steady voltage impressed on the grid 20 is derived from a direct potential source 26 by means of a resistance network $R_1$, $R_2$ and $R_3$, potentiometer $P_1$, and a grid resistance $R_4$. The network as thus far defined is from the prior art. By moving the potentiometer $P_1$ toward the positive terminal of the source 26, the voltage $V_G$ on the grid 20 is increased from a value $V_1$ to the new value $V_2$. And, as shown in Fig. 2, the output frequency of the oscillator decreases from a value $f_1$ to a value $f_2$, approaching the new value $f_2$ asymptotically due to the thermal lag of the distortion mechanism shown in Fig. 1B. The time, $t_1—t_0$, required for the thermal process to take place as verified experimentally with a 2K45 type tube, is on the order of from 45 seconds to 1 minute. Varying the potentiometer $P_1$ in a negative manner will produce similar results in the opposite directions to those of Fig. 2.

The present invention greatly reduces the elapsed time (time lag), $t_1—t_0$, by the addition of an anticipator circuit comprising a resistor $R_a$, capacitor C and potentiometer $P_2$. Potentiometers $P_1$ and $P_2$ comprise a dual potentiometer and are mechanically coupled so that as the movable arm of potentiometer $P_1$ is varied toward the positive terminal of source 26 (upward in Fig. 1) the arm of $P_2$ also moves in a positive manner, and vice versa.

The dual potentiometer is so constructed that the voltage range explored by the arm $P_2$ is the entire above-ground voltage of the supply 26, while the arm $P_1$ in an equal excursion explores a much smaller range of voltages about ground. By way of example, these voltages in an experimental model were, for the arm $P_2$, 0 to +300 volts, and for the arm $P_1$, −45 to +20 volts. Therefore, an adjustment of the dual potentiometer which makes the potential of the arm $P_1$ more positive will also make the potential of the arm $P_2$ more positive, but by a greater increment, so that the potential of the arm $P_2$ is always more positive than that of the arm $P_1$. The potential difference between the arms will be increased by making $P_1$ more positive (or, less negative) and will be decreased by making $P_1$ more negative (or, less positive).

During a certain steady state condition, there is a steady direct voltage $V_G=V_1$ impressed on the grid 20. Due to the condenser C and assuming no grid current, this voltage $V_G$ is equal to the voltage with respect to ground of the potentiometer arm $P_1$. There is also a direct voltage impressed on the condenser C, giving the condenser a certain charge as indicated in Fig. 1A. This latter voltage is equal to the difference of the potentials of the arms $P_1$ and $P_2$.

Figure 3A:
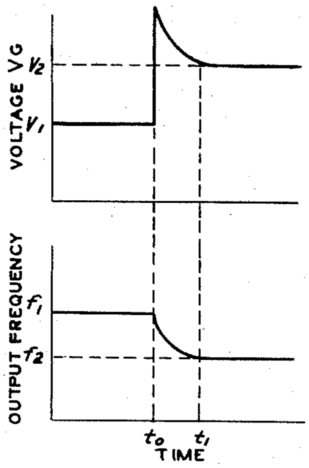
Figs. 3A, 3B and Fig. 4 shows graphs illustrative of the action of the present invention.

Increasing the voltage $V_G=V_1$ to a new value $V_2$ by an adjustment of the potentiometer arm $P_1$, will, as previously explained, increase the potential difference between the arms $P_1$ and $P_2$, and also the voltage on the condenser C. This increase will cause a charging current $i_c$ to flow in a well-known manner and in a direction as shown in Fig. 1. Due to this current $i_c$, and still assuming no grid current, the voltage $V_G$ will be higher than the potential of the arm $P_1$ by the $i_cR_4$ voltage drop. This voltage drop will have the same wave shape as the transient current $i_c$, causing the voltage $V_G$ to overshoot the value $V_2$ as shown in Fig. 3A. And, as also shown in Fig. 3A, the elapsed time $t_1—t_0$, is considerably reduced, being now on the order of from 7 to 10 seconds as experimentally verified.

Figure 3B:
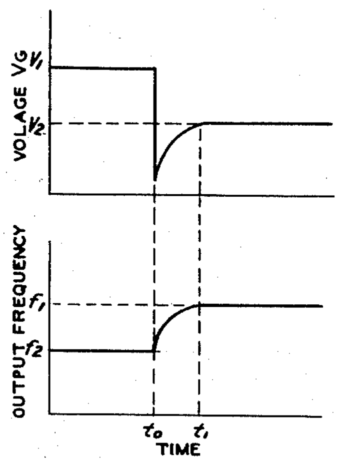

Decreasing the voltage $V_G$ by adjusting the arm $P_1$ in a negative manner will, as previously explained, cause a decrease in the positive direct voltage impressed on the condenser C. This will allow the condenser to partially discharge, with the discharging current $i_d$ flowing in a well-known manner and in a direction opposite to that of the charging current $i_c$. This transient current will produce a voltage $V_G$ overshoot as shown in Fig. 3B due to the transient voltage drop $i_dR_4$. The elapsed time, $t_1—t_0$, is on the same order as that illustrated in Fig. 3A.

The duration of the transient, or overshoot, i. e., the period of decay, is approximately equal to the time constant of the resistance $R_a$ and the capacitance C, the resistance of the potentiometer $P_2$ being small as compared to the resistance R. For optimum operation, this period has that value which will minimize the elapsed time of the thermal process and prevent overshooting of the desired frequency.

In order not to exceed the maximum allowable tuner power, a clamping diode 27 with potentiometer 28 and battery 29 is connected to the triode grid 20.

Figure 4:
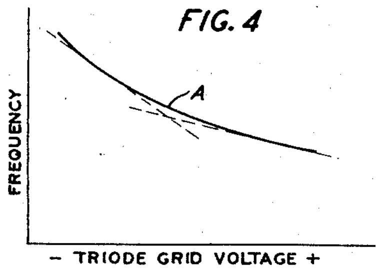

To obtain the proper overshoot over the range of frequencies to be tuned, it may be necessary to make the potentiometer $P_2$ a non-linear device. In the model tested using a 2K45 type tube, the tube was found to have a frequency vs grid voltage characteristic of slight curvature as shown by curve A in Fig. 4. The potentiometer $P_2$ was therefore given a semilog taper to produce a larger voltage overshoot at the low frequency end (the upper end in Fig. 1) than at the high frequency end in order to compensate for the smaller rate of change of frequency at the low frequencies.

Although the invention has been described in detail as relating to a thermally tuned reflex oscillator, it is obviously applicable to other control devices wherein the control variable is a direct voltage and wherein there is a time lag, due to either thermal or mechanical inertia. Specific applications and modifications of the invention will readily occur to those skilled in the art.

What is claimed is:

1. In combination with a voltage controlled device having an inherent time lag in its response characteristic, a source of direct-current voltage, variable means connected to said source to derive a direct voltage therefrom, means to apply said derived direct voltage to said device, anticipator means connected to said source of decrease said time lag comprising variable resistance in a circuit with capacitance, means constrained to operate as a consequence of the operation of said variable means to vary said resistance and thereby produce a transient direct voltage when said variable means is operated, and means to apply said transient voltage to said device in an additive relation with said derived direct voltage to decrease said time lag.

2. Control means comprising thermally expansible means as the principal variant thereof, means to vary the temperature of said thermally expansible means comprising a substantially linear variable source of direct-current voltage connected to said thermally expansible means, a mechanically movable member for varying the voltage of said source, anticipator means connected to said thermally expansible means comprising variable resistance and capacitance in circuit with a source of direct-current voltage, a mechanically movable member for varying said resistance, and means mechanically coupling the operating members of said variable source of direct-current voltage and said variable resistance to cause said members to move together.

3. A combination in accordance with claim 2 in which the product of said resistance in ohms and said capacitance in farads has that value for each operation of said variable source of direct-current voltage which will cause said thermally expansible means to reach equilibrium temperature in a minimum time without overshoot.

4. In combination with a voltage responsive device having an inherent time lag in its response characteristic, a variable source of direct-current voltage connected to said device, anticipator means comprising variable resistance and capacitance in a circuit connected to a source of direct-current voltage, means coordinating variations in said voltage with variations in said resistance whereby a transient direct voltage is produced by said anticipator circuit upon an operation of said variable source in a sense determined by the sense of variation of said variable source, and means to apply said transient voltage to said device to reduce said time lag.

5. In a space discharge device having a resonant cavity, mechanical means comprising a thermally expansible element having an inherent time lag in its response characteristic to vary the configuration of said cavity and a variable source of direct-current potential connected to said element to control the amount of heat generated therein, means connected to said source to vary the potential applied to said element by said source which comprise variable resistance means to derive a voltage from said source equal to the voltage required to achieve the desired steady state temperature of said element, and other variable means mechanically coupled to said variable resistance means comprising resistance in a circuit with capacitance to derive a transient voltage upon an operation of said variable resistance means, said transient having a period of decay bearing a predetermined relation to said time lag.

6. In a control device comprising voltage controlled thermally expansible means having an inherent time lag in its response characteristic as the principal variant thereof, the combination with a source of direct potential and variable means to supply a steady direct potential to said thermally expansible means of other variable means comprising resistance and capacitance connected in a circuit with said source and constrained to operate as a consequence of the operation of said first-named variable means to produce a transient voltage having a polarity determined by the sense of variation of said first-named variable means and having a period of decay bearing a predetermined relation to said time lag, and circuit means to add said transient voltage to said steady voltage.

7. In an ultra-high frequency space discharge device, frequency determining means having a mechanical tuning member responsive in its operation to the distortion of a voltage responsive thermally expansible element, means to control the heat dissipated in said element comprising a source of direct-current voltage, variable means to derive a direct voltage from said source equal to the voltage required to distort said thermally expansible element to a degree sufficient to obtain a desired tuning, other variable means connected to said source and mechanically coupled to said first-named means comprising resistance in a circuit with capacitance to derive a transient direct voltage from said source, and means to apply said derived direct voltage and said transient voltage to said thermally expansible element.

8. The combination according to claim 7, said transient characterized by an initial surge of predetermined amplitude substantially simultaneously with an operation of said means to derive a direct voltage, said surge followed by a substantially asymptotic decay of a period determined substantially by the product of said resistance in ohms and said capacitance in farads, said product having that value which will cause said thermally expansible element to progress from one thermal equilibrium condition to another in a minimum time without overshoot, said equilibrium conditions determined by the adjustment of said means to derive a direct voltage.

9. A combination in accordance with claim 1 in which the product of said resistance in ohms and said capacitance in farads has that value for each operation of said variable means which will cause said device to reach a steady state condition in a minimum time without overshoot.

ELMO E. CRUMP.

No references cited.